(12) United States Patent
Cutler

(10) Patent No.: US 7,598,975 B2
(45) Date of Patent: Oct. 6, 2009

(54) AUTOMATIC FACE EXTRACTION FOR USE IN RECORDED MEETINGS TIMELINES

(75) Inventor: Ross G. Cutler, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 840 days.

(21) Appl. No.: 10/978,172

(22) Filed: Oct. 30, 2004

(65) Prior Publication Data

US 2005/0285943 A1 Dec. 29, 2005

Related U.S. Application Data

(63) Continuation-in-part of application No. 10/177,315, filed on Jun. 21, 2002, now Pat. No. 7,259,784.

(51) Int. Cl.
*H04N 7/15* (2006.01)
(52) U.S. Cl. .................. 348/14.08; 348/14.06
(58) Field of Classification Search ............ 348/14.06, 348/14.08, 14.09; 370/260
See application file for complete search history.

(56) References Cited

U.S. PATENT DOCUMENTS

| 4,626,893 | A | * | 12/1986 | Yamanaka ............ 348/176 |
| 5,504,524 | A | * | 4/1996 | Lu et al. ............... 348/223.1 |
| 5,539,483 | A | | 7/1996 | Nalwa |
| 5,745,305 | A | | 4/1998 | Nalwa |
| 5,793,527 | A | | 8/1998 | Nalwa |
| 5,990,934 | A | | 11/1999 | Nalwa |
| 6,005,611 | A | | 12/1999 | Gullichsen et al. |
| 6,043,837 | A | | 3/2000 | Driscoll, Jr. et al. |
| 6,101,287 | A | * | 8/2000 | Corum et al. ......... 382/274 |
| 6,111,702 | A | | 8/2000 | Nalwa |
| 6,115,176 | A | | 9/2000 | Nalwa |
| 6,128,143 | A | | 10/2000 | Nalwa |
| 6,141,145 | A | | 10/2000 | Nalwa |
| 6,144,501 | A | | 11/2000 | Nalwa |
| 6,175,454 | B1 | | 1/2001 | Hoogland et al. |
| 6,195,204 | B1 | | 2/2001 | Nalwa |
| 6,219,089 | B1 | | 4/2001 | Driscoll, Jr. et al. |
| 6,219,090 | B1 | | 4/2001 | Nalwa |
| 6,222,683 | B1 | | 4/2001 | Hoogland et al. |
| 6,285,365 | B1 | | 9/2001 | Nalwa |
| 6,313,865 | B1 | | 11/2001 | Driscoll, Jr. et al. |

(Continued)

FOREIGN PATENT DOCUMENTS

WO    WO 98/47291    10/1998

(Continued)

OTHER PUBLICATIONS

European Patent Office European Search Report, for European Patent Application No. 05 111 765.3, Examiner J. Horstmannshoff, Apr. 4, 2006, Munich.

(Continued)

*Primary Examiner*—Stella L Woo

(57) ABSTRACT

Faces of speakers in a meeting or conference are automatically detected and facial images corresponding to each speaker are stored in a faces database. A timeline is created to graphically identify when each speaker is speaking during playback of a recording of the meeting. Instead of generically identifying each speaker in the timeline, a facial image is shown to identify each speaker associated with the timeline.

32 Claims, 6 Drawing Sheets

U.S. PATENT DOCUMENTS

| | | |
|---|---|---|
| 6,331,869 B1 | 12/2001 | Furlan et al. |
| 6,337,708 B1 | 1/2002 | Furlan et al. |
| 6,341,044 B1 | 1/2002 | Driscoll, Jr. et al. |
| 6,346,967 B1 | 2/2002 | Gullichsen et al. |
| 6,356,296 B1 | 3/2002 | Driscoll, Jr. et al. |
| 6,356,397 B1 | 3/2002 | Nalwa |
| 6,369,818 B1 | 4/2002 | Hoffman et al. |
| 6,373,642 B1 | 4/2002 | Wallerstein et al. |
| 6,388,820 B1 | 5/2002 | Wallerstein et al. |
| 6,392,687 B1 | 5/2002 | Driscoll, Jr. et al. |
| 6,424,377 B1 | 7/2002 | Driscoll, Jr. et al. |
| 6,426,774 B1 | 7/2002 | Driscoll, Jr. et al. |
| 6,459,451 B2 | 10/2002 | Driscoll, Jr. et al. |
| 6,466,254 B1 | 10/2002 | Furlan et al. |
| 6,480,229 B1 | 11/2002 | Driscoll, Jr. et al. |
| 6,493,032 B1 | 12/2002 | Wallerstein et al. |
| 6,515,696 B1 | 2/2003 | Driscoll, Jr. et al. |
| 6,535,649 B1 * | 3/2003 | Chiu .................... 382/274 |
| 6,539,547 B2 | 3/2003 | Driscoll, Jr. et al. |
| 6,583,815 B1 | 6/2003 | Driscoll, Jr. et al. |
| 6,593,969 B1 | 7/2003 | Driscoll, Jr. et al. |
| 6,597,520 B2 | 7/2003 | Wallerstein et al. |
| 6,628,825 B1 * | 9/2003 | Yamazoe et al. ........... 382/167 |
| 6,700,711 B2 | 3/2004 | Nalwa |
| 6,741,250 B1 | 5/2004 | Furlan et al. |
| 6,756,990 B2 | 6/2004 | Koller |
| 6,788,340 B1 * | 9/2004 | Chen et al. ............ 348/229.1 |
| 6,795,106 B1 | 9/2004 | Cooper |
| 6,885,509 B2 | 4/2005 | Wallerstein et al. |
| 6,917,702 B2 * | 7/2005 | Beardsley ................. 382/154 |
| 6,924,832 B1 | 8/2005 | Shiffer et al. |
| 2002/0034020 A1 | 3/2002 | Wallerstein et al. |
| 2002/0041324 A1 | 4/2002 | Satoda |
| 2002/0063802 A1 | 5/2002 | Gullichsen et al. |
| 2002/0094132 A1 | 7/2002 | Hoffman et al. |
| 2002/0154417 A1 | 10/2002 | Wallerstein et al. |
| 2003/0142402 A1 | 7/2003 | Carbo et al. |
| 2003/0146982 A1 * | 8/2003 | Tindall ................. 348/223.1 |
| 2003/0184660 A1 * | 10/2003 | Skow ................... 348/223.1 |
| 2003/0193606 A1 | 10/2003 | Driscoll, Jr. et al. |
| 2003/0193607 A1 | 10/2003 | Driscoll, Jr. et al. |
| 2003/0220971 A1 | 11/2003 | Kressin |
| 2004/0008407 A1 | 1/2004 | Wallerstein et al. |
| 2004/0008423 A1 | 1/2004 | Driscoll et al. |
| 2004/0021764 A1 | 2/2004 | Driscoll, Jr. et al. |
| 2004/0252384 A1 | 12/2004 | Wallerstein et al. |
| 2004/0254982 A1 | 12/2004 | Hoffman et al. |
| 2005/0046703 A1 | 3/2005 | Cutler |
| 2005/0078172 A1 * | 4/2005 | Harville et al. .......... 348/14.09 |
| 2005/0117034 A1 | 6/2005 | Cutler |
| 2005/0151837 A1 | 7/2005 | Cutler |
| 2006/0198554 A1 * | 9/2006 | Porter et al. .............. 382/159 |

FOREIGN PATENT DOCUMENTS

| | | |
|---|---|---|
| WO | WO 00/11512 | 3/2000 |
| WO | WO 2004/004320 A1 | 1/2004 |
| WO | WO 2004/111689 | 12/2004 |
| WO | WO 2004/112290 | 12/2004 |
| WO | WO 2005/002201 | 1/2005 |

OTHER PUBLICATIONS

J. Davis "Mosaics of scenes with moving objects", Proceedings of IEEE Computer Society Conference on Computer Vision and Pattern Recognition, Jun. 23-25, 1998, pp. 354-360.

Choi, et, al., "New Autofocusing Technique Using the Frequency Selective Weighted Median Filter for Video Cameras", IEEE Transactions on Consumer Electronics, vol. 45, No. 3, Aug. 1999.

Subbarao, et, al., "Selecting the Optimal Focus Measure for Autofocusing and Depth-From-Focus", IEEE Transactions on PAMI, vol. 20, No. 8, August 1998.

Szeliski, et, al., "Video mosaics for virtual environments" IEEE Computer Graphics and Applications, pp. 22-30, Mar. 1996.

Uyttendale, et, al., "Eliminating ghosting and exposure artifacts in image mosaics" In IEEE Computer Society Conference on Computer Vision and Pattern Recognition (CVPR'2001), vol. II pp. 509-516, Kauai, Hawaii, Dec. 2001.

Charfi, et, al., "Focusing Criterion", Electronic Letters, vol. 27, No. 14, pp. 1233-1235, Jul. 1991.

Davis, J. "Mosaics of scenes with Moving Objects" IEEE Computer Society Conference on Computer Vision and Pattern Recognition, 1998.

Healey, et, al., "Radiometric CCD Camera Calibration and Noise Estimation", IEEE Transactions on Pattern Analysis and Machine Intelligence, vol. 16, No. 3, pp. 267-276, Apr. 1994.

Hasler, et, al "Colour Handling in Panoramic Photography", Proceedings of SPIE vol. 4309, 2001.

Kang, et al. "Can We Calibrate a Camera using an Image of a Flat, Textureless Lambertian Surface", ECCV, 2000.

Kemberova , et al., The Effect of Radiometric Correction on Multicamera Algorithms' Technical Report MS-CIS-97-17, 1997.

Zhang, et, al., "Real-Time Multi-View Face Detection", Face and Gesture Recognition, 2002, Washington D.C., May 2002.

Majumder, et, al., "Achieving Color Uniformity Across Multi-Projector Displays", IEEE Visualization 2000.

Szeliski, et, al., "Creating full view panoramic image mosaics and Environment Maps" Computer Graphics (SIGGRAPH '97), pp. 251-258, 1997.

Widjaja, "Use of Wavelet Analysis for Improving Autofocusing Capability", Optics Communications 151, pp. 12-14, 1998.

Applicant's Statement: The references cited in this IDS were previously submitted to the Office in connection with U.S. Appl. No. 10/177,315 filed Jun. 21, 2002 and again in connection with the present Application, the references being filed on Oct. 22, 2008. Applicant points out that for any reference listed in the accompanying IDS, should a year of publication be listed without a month, that the year of publication is sufficiently earlier than the effective U.S. filed and any foreign priority date so that the particular month of publication is not in issue (see MPEP 609.04(a)).

* cited by examiner

AUTOMATIC FACE EXTRACTION FOR USE IN RECORDED MEETINGS TIMELINES

CROSS-REFERENCE(S) TO RELATED APPLICATION(S)

This application is a continuation-in-part of U.S. patent application Ser. No. 10/177,315, entitled "A System and Method for Distributed Meetings", filed Jun. 21, 2002 now U.S. Pat. No. 7,259,784 by the present inventor and assigned to Microsoft Corp., the assignee of the present application. Applicant claims priority to the filing date of said application, which is hereby incorporated by reference for all that it discloses and teaches.

TECHNICAL FIELD

The following description relates generally to video image processing. More particularly, the following description relates to providing an indexed timeline for video playback.

BACKGROUND

Playback of recorded video of scenarios that include more than one speaker—such as playback of a recorded meeting—is usually shown contemporaneously with an indexed timeline. Using the timeline, a user can quickly move to a particular time in the meeting by manipulating one or more timeline controls. When the video includes more than one speaker, multiple timelines may be used where one timeline is associated with a particular speaker. Each timeline indicates when a corresponding speaker is speaking. That way, a user can navigate to portions of the meeting where a particular speaker is speaking.

Such multiple timelines may be labeled in a generic fashion to identify each speaker as, for example, "Speaker 1," "Speaker 2," etc. Current techniques for automatically labeling timelines with specific speaker names are inaccurate and also may require a database of users and their associated voiceprints and faceprints, which could entail security and privacy issues.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The following description relates to various implementations and embodiments for automatically detecting each speaker's face in a multi-speaker environment and associating one or more images of a speaker's face with a portion of a timeline that corresponds to the speaker. This sort of specific labeling has advantages over generic labeling in that a viewer can more readily determine which portion of a timeline corresponds to a particular one of multiple speakers.

In the following discussion, an instance of a panoramic camera is described wherein the panoramic camera is used to record a meeting having more than one participant and/or speaker. Although a panoramic camera including multiple cameras is described, the following description also relates to single cameras and multi-camera devices having two or more cameras.

A panoramic image is input to a face tracker (FT) which detects and tracks faces in the meeting. A microphone array is input to a sound source localizer (SSL) which detects locations of speakers based on sound. The outputs from the face tracker and from the sound source localizer are input to a virtual cinematographer to detect locations of the speakers.

The speakers are post-processed with a speaker clustering module which clusters speakers temporally and spatially to better delineate an aggregate timeline that includes two or more individual timelines. The (aggregate) timeline is stored in a timeline database. A faces database is created to store one or more images for each speaker, at least one of each face to be used in a timeline associated with a speaker.

The concepts presented and claimed herein are described in greater detail, below, with regard to one or more appropriate operating environments. Some of the elements described below are also described in parent U.S. patent application Ser. No. 10/177,315, entitled "A System and Method for Distributed Meetings", filed Jun. 21, 2002 and incorporated by reference above.

Exemplary Operating Environment

Figure 1:
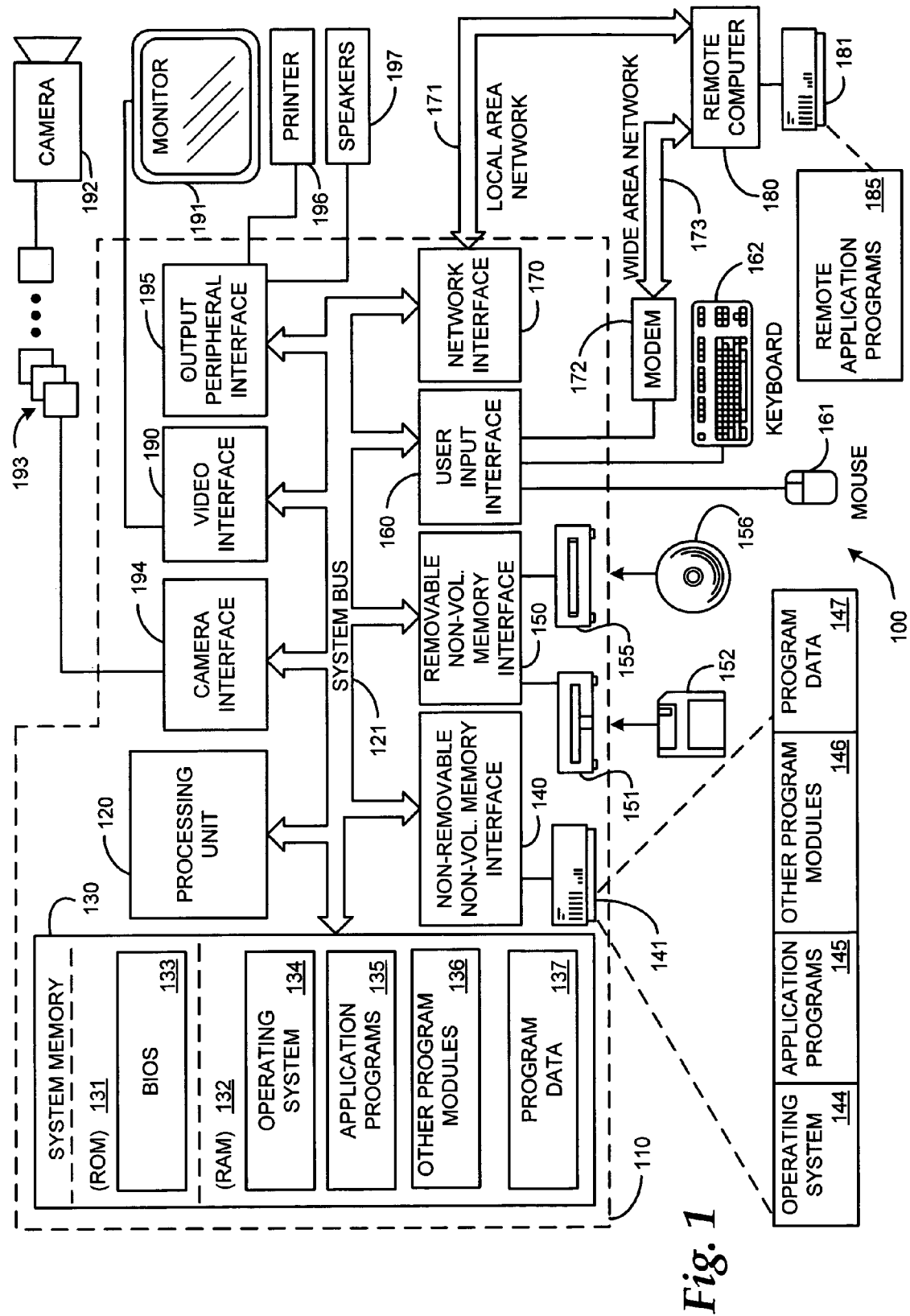
FIG. 1 is a block diagram depicting an exemplary general purpose computing/camera device.

FIG. 1 is a block diagram depicting a general purpose computing/camera device. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

The described techniques and objects are operational with numerous other general purpose or special purpose computing system environments or configurations. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The following description may be couched in the general context of computer-executable instructions, such as program modules, being executed by a computer. Generally, program modules include routines, programs, objects, components, data structures, etc. that perform particular tasks or implement particular abstract data types. The described implementations may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anon-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Panoramic Camera and Client Device

Figure 2:
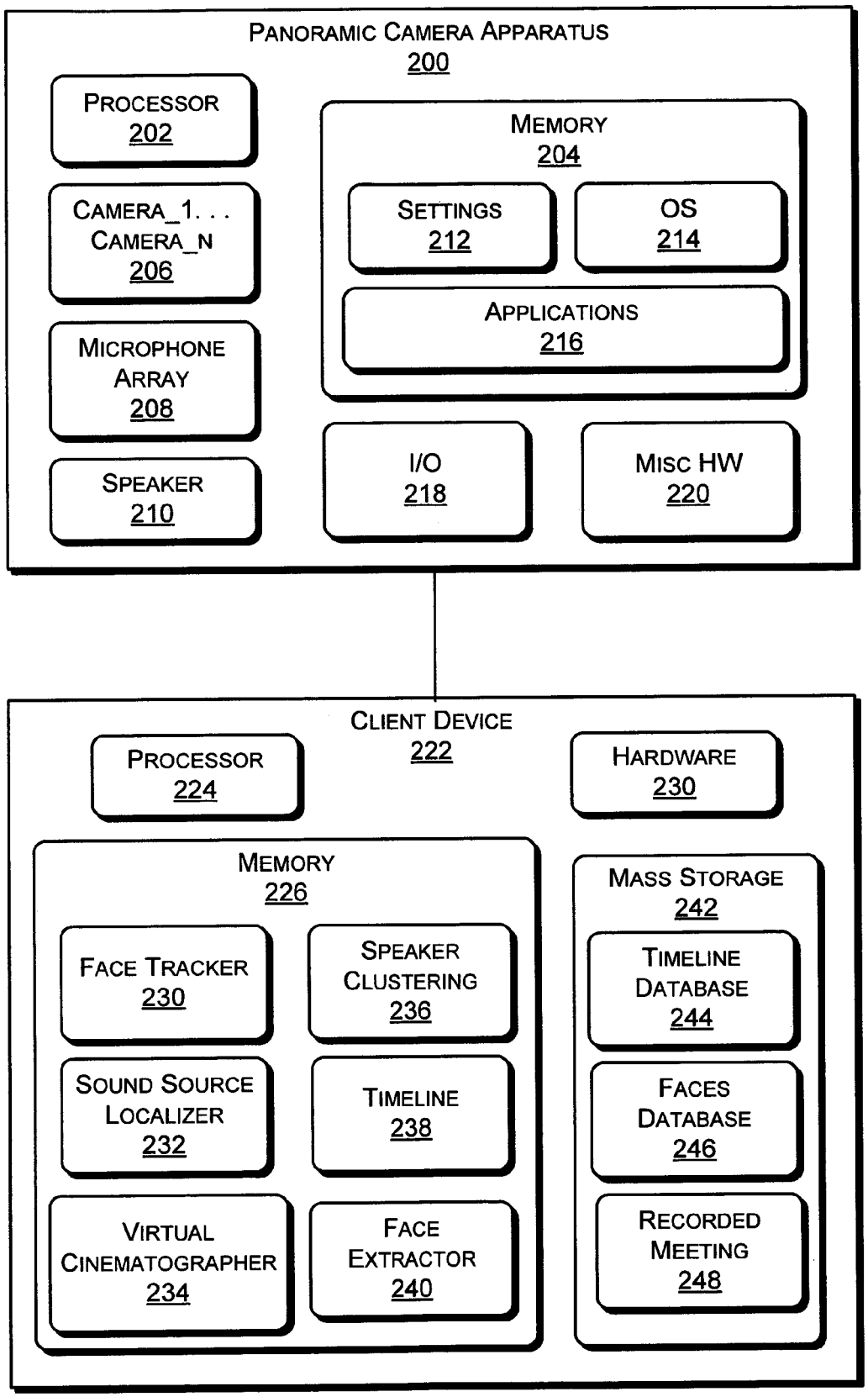
FIG. 2 is a block diagram representing an exemplary panoramic camera and client device.

FIG. 2 is a block diagram representing an exemplary panoramic camera apparatus 200 and an exemplary client device 222. Although it is shown in a particular configuration, it is noted that the panoramic camera apparatus 200 may be any apparatus that includes a panoramic camera or its functional equivalent. More or less components than those shown included with the panoramic camera apparatus 200 may be included in a practical application incorporating one or more of the techniques described herein.

The panoramic camera apparatus 200 includes a processor 202 and memory 204. The panoramic camera apparatus 200 creates a panoramic image by stitching together several individual images produced by multiple cameras 206 (designated 206_1 through 206_n). The panoramic image may be a complete 360° panoramic image or it may be only a portion thereof. It is noted that although a panoramic camera apparatus 200 is shown and described herein, the described techniques may also be utilized with a single camera.

The panoramic camera apparatus 200 also includes a microphone array 208. As will be described in greater detail below, the microphone array is configured so that sound direction may be localized. In other words, analysis of sound input into the microphone array yields a direction from which a detected sound is produced. A speaker 210 may also be included in the panoramic camera apparatus 200 to enable a speakerphone or to emit notification signals and the like to users.

The memory 204 stores several camera settings 212 such as calibration data, exposure settings, stitching tables, etc. An operating system 214 that controls camera functions is also stored in the memory 204 along with one or more other camera software applications 216.

The panoramic camera apparatus 200 also includes an input/output (I/O) module 218 for transmitting data from and receiving data to the panoramic camera apparatus 200, and miscellaneous other hardware 220 elements that may be required for camera functionality.

The panoramic camera apparatus 200 communicates with at least one client device 222, which includes a processor 224, memory 226, a mass storage device 242 (such as a hard disk drive) and other hardware 230 that may be required to execute the functionality attributed to the client device 222 below.

The memory 226 stores a face tracker (FT) module 230 and a sound source localization (SSL) module 232. The face tracker module 230 and the sound source localization module 232 are used in conjunction with a virtual cinematographer 234 to detect a person in a camera scene and determine if and when the person is speaking. Any of several conventional methods of sound source localization may be used. Various face tracker methods (or person detection and tracking systems), including the one described in the parent application hereto, may be used as described herein.

The memory 226 also stores a speaker clustering module 236 that is configured to determine a primary speaker when two or more persons are speaking and concentrate a particular timeline portion to the primary speaker. In most meeting situations, there are instances where more than one person talks at the same time. Usually, a primary speaker is speaking when another person interrupts the speaker for a short period or talks over the speaker. The speaker clustering module 236 is configured to cluster speakers temporally and spatially to clean up the timeline.

A timeline 238 is created by the virtual cinematographer 234. The timeline 238 is stored in a timeline database 244 on the mass storage device 242. The timeline database 238 includes a plurality of fields including, but not necessarily limited to, time, speaker number, and speaker bounding box within a camera image (x, y, width, height). The timeline database 238 may also include one or more speaker face angles (azimuth and elevation).

A face extractor module 240 is also stored in the memory 226 and is configured to extract an image of a speaker's face from a face bounding box (identified by the face tracker 230) of a camera image. The face extractor module 240 stores extracted facial images in a face database 246 on the mass storage device 242.

In at least one implementation, multiple facial images may be stored for one or more speakers. Parameters can be specified to determine which facial image is used at which particular times. Or, a user may be able to manually select a particular facial image from the multiple facial images.

In at least one alternative implementation, only a single facial image is stored for each speaker. The stored facial image may be a single image extracted by the face extractor module 240, but the face extractor module 240 may also be configured to select a best image of a speaker.

Selecting a best image of a speaker can be accomplished by identifying frontal facial angles (on an assumption that an image with a frontal facial image is a better representation than an alternative image), by identifying a facial image that exhibits a minimum of motion or by identifying a facial image that maximizes facial symmetry.

The recorded meeting 248 is also stored on the mass storage device 242 so that it can be recalled and played back at a later time.

The elements and functionality shown and described with regard to FIG. 2 will be described more fully below, with respect to subsequent figures.

Exemplary Playback Screen

Figure 3:
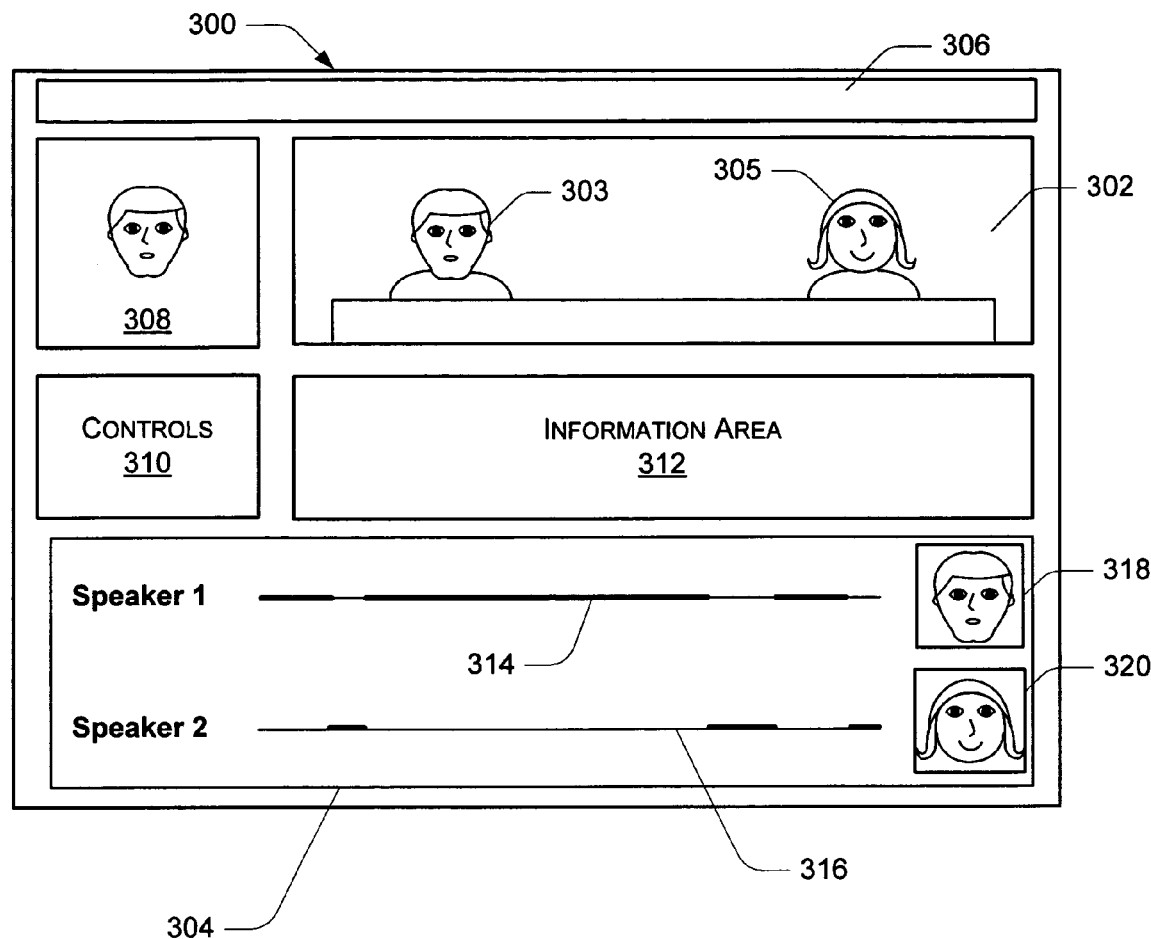
FIG. 3 is a representation of an exemplary playback screen with a panoramic image and a facial image timeline.

FIG. 3 is a line drawing representation of a playback screen 300 that includes a panoramic image 302 and a facial image timeline 304. The panoramic image 302 is shown with a first meeting participant 303 and a second meeting participant 305. The playback screen 300 is also shown having a title bar 306 and an individual image 308. The individual image 308 is an optional feature wherein a particular individual is focused on, typically a primary speaker. In FIG. 3, the individual image 308 displays a facial image of the first meeting participant 303.

The exemplary playback screen 300 also includes a controls section 310 that contains controls typically found in a media player, such as a play button, a fast forward button, a rewind button, etc. An information area 312 is included in the playback screen 300 where information regarding the subject matter of the playback screen 300 may be displayed. For example, a meeting title, a meeting room number, a list of meeting attendees, and the like may be displayed in the information area 312.

The facial image timeline 304 includes a first sub-timeline 314 that corresponds to the first meeting participant 303 and a second sub-timeline 316 that corresponds to the second meeting participant. Each sub-timeline 314, 316 indicates sections along a temporal continuum where the corresponding meeting participant is speaking. A user may directly access any point on a sub-timeline 314, 316 to immediately access a portion of the meeting wherein a particular meeting participant is speaking.

A first facial image 318 of the first meeting participant 303 appears adjacent to the first sub-timeline 314 to indicate that the first sub-timeline 314 is associated with the first meeting participant 318. A facial image 320 of the second meeting participant 305 appears adjacent to the second sub-timeline 316 to indicate that the second sub-timeline 316 is associated with the second meeting participant 305.

Figure 4:
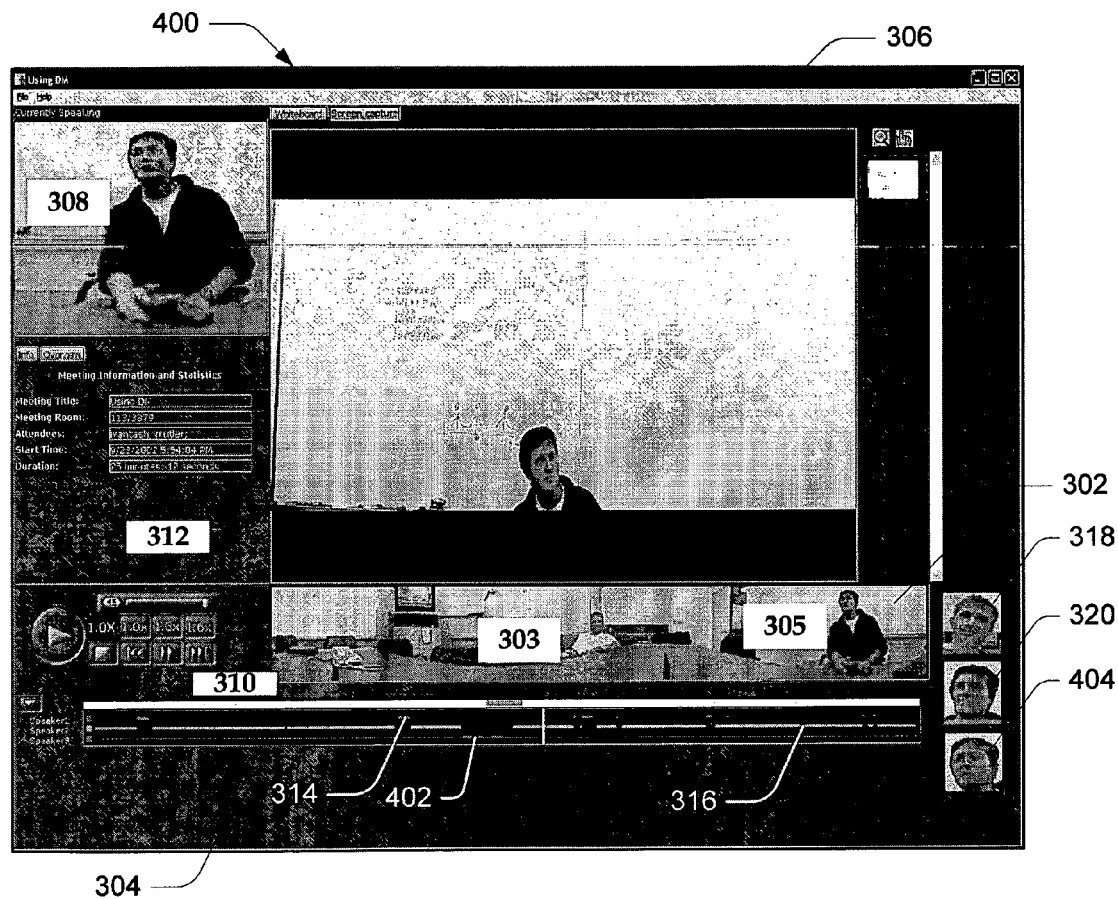
FIG. 4 is an exemplary playback screen with a panoramic image and a facial image timeline.

FIG. 4 shows an exemplary playback screen 400 that includes similar elements as the exemplary playback screen 300 shown and described in FIG. 3. The elements and reference numerals shown and described with respect to FIG. 3 will be used with reference to the exemplary playback screen 400 of FIG. 4.

The exemplary playback screen 400 includes a panoramic image 302 and a facial image timeline 304. The panoramic image 302 shows a first meeting participant 303 and a second meeting participant 305. A title bar 306 spans the top of the playback screen 400 and an individual image 408 shows the second meeting participant 303.

The exemplary playback screen 400 also includes a whiteboard speaker image 402 that displays a meeting participant (in this case, the second meeting participant 305) that is situated before a whiteboard. The whiteboard speaker image 402 is not included in the playback screen 300 of FIG. 3 and is used here to show how other images may be included in any particular playback screen 300, 400.

A controls section 310 includes multimedia controls and an information area 312 displays information regarding the meeting shown on the playback screen 400.

The facial image timeline 304 includes a first sub-timeline 314, a second sub-timeline 316 and a third sub-timeline 404. It is noted that while only two sub-timelines are shown in FIG. 3, a timeline may contain any manageable number of sub-timelines. In FIG. 4, for example, there are three sub-timelines.

It is noted that while there are only two meeting participants in this example, there are three sub-timelines. This is because a single speaker may be associated with more than a single sub-timeline. In the present example, the second sub-timeline 316 is associated with the second meeting participant 305 while the second meeting participant 305 is at the whiteboard, and the third sub-timeline 404 is associated with the second meeting participant 305 while the second meeting participant 305 is situated at a location other than the whiteboard.

This situation can happen when a meeting participant occupies more than one location during a meeting. The virtual cinematographer 234 in this case has detected speakers in three locations. It does not necessarily know that only two speakers are present in those locations. This feature assists a user in cases where the user is interested mainly in a speaker when the speaker is in a certain position. For example, a user may only want to play a portion of a recorded meeting when a speaker is situated at the whiteboard.

The exemplary playback screen 400 also includes a first facial image 318 of the first meeting participant 303 and a second facial image 320 of the second meeting participant 305. In addition, a third facial image 406 is included and is associated with the third sub-timeline 404. The third facial image 406 corresponds with a second location of the second meeting participant 305.

The techniques used in presenting the exemplary playback screens 300, 400 will be described in greater detail below, with respect to the other figures.

Exemplary Methodological Implementation: Creation of Facial Image Timeline

Figure 5:
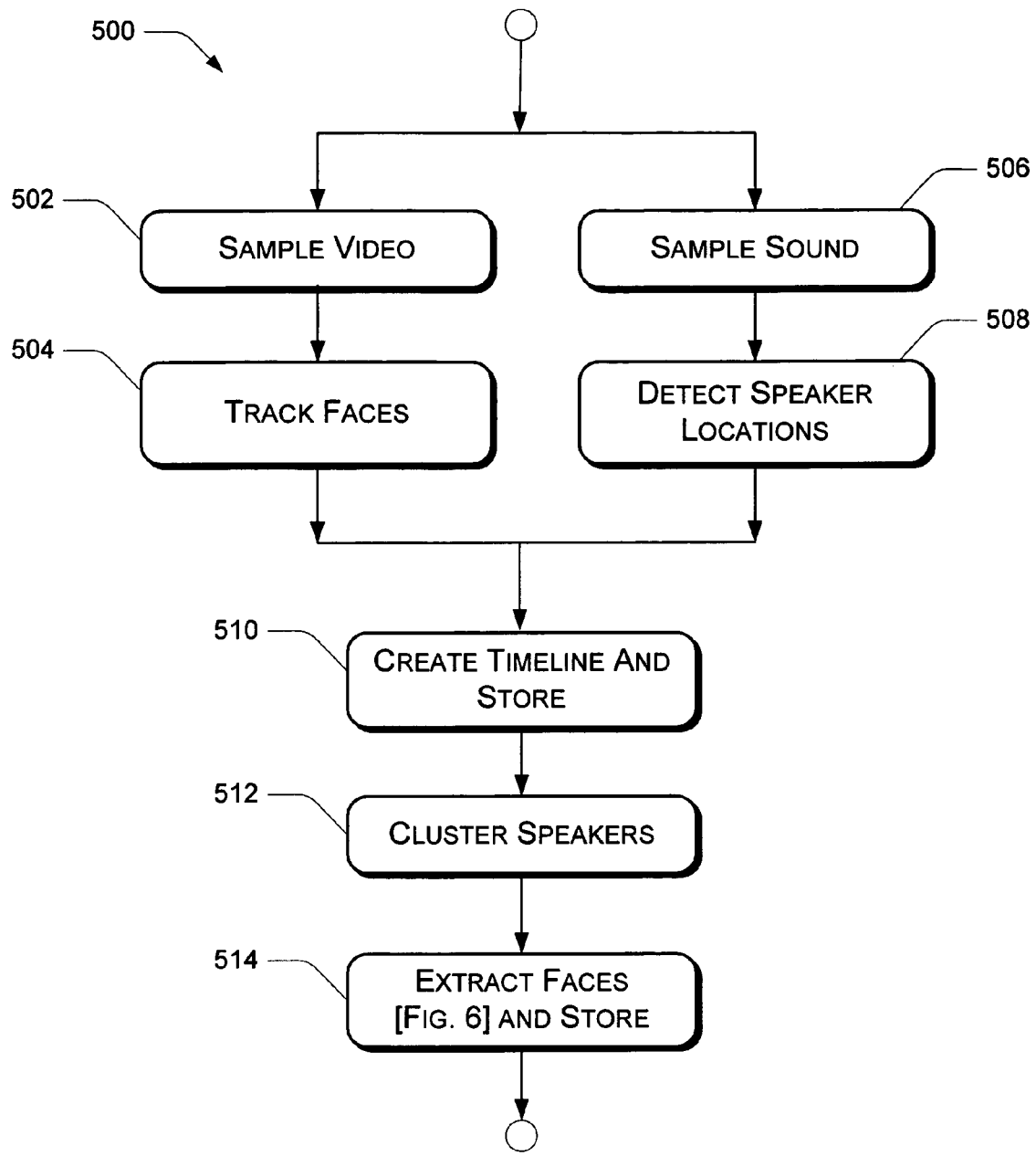
FIG. 5 is an exemplary flow diagram of a methodological implementation for creating a timeline with facial images.

FIG. 5 is an exemplary flow diagram 500 of a methodological implementation for creating a timeline with facial images. In the following discussion of the exemplary flow diagram 500, continuing reference is made to the elements and reference numerals shown in previous figures.

At block 502, the panoramic camera apparatus 200 samples one or more video images to create a panoramic image. The panoramic image is input to the face tracker 230 (block 504) which detects and tracks faces in the image. Approximately simultaneously at block 506, the microphone array 208 samples sound corresponding to the panoramic image and inputs the sound into the sound source localizer 232 which detects locations of speakers based on the sampled sound at block 508.

The virtual cinematographer 234 processes data from the face tracker 230 and the sound source localizer 232 to create the timeline 238 at block 510. At block 512, the speaker clustering module 236 clusters speakers temporally and spatially to consolidate and clarify portions of the timeline 238 as described previously.

The timeline is stored in the timeline database 244 with the following fields: time, speaker number, speaker bounding box in image (x, y, width, height), speaker face angles (azimuth, elevation), etc.

Using the panoramic image and face identification coordinates (i.e. face bounding boxes) derived by the face tracker 230, the face extractor 240 extracts a facial image of the speakers at block 514. Extracted facial images are stored in the faces database 246 and are associated with a speaker number.

As previously noted, the face extractor 240 may be configured to extract more than one image for each speaker and use what the face extractor 240 determines to be the best image in the timeline 238.

An exemplary methodological implementation of selecting a "best" facial image and creating the faces database 246 is shown and described below, with respect to FIG. 6.

Exemplary Methodological Implementation: Creating a Faces Database

Figure 6:
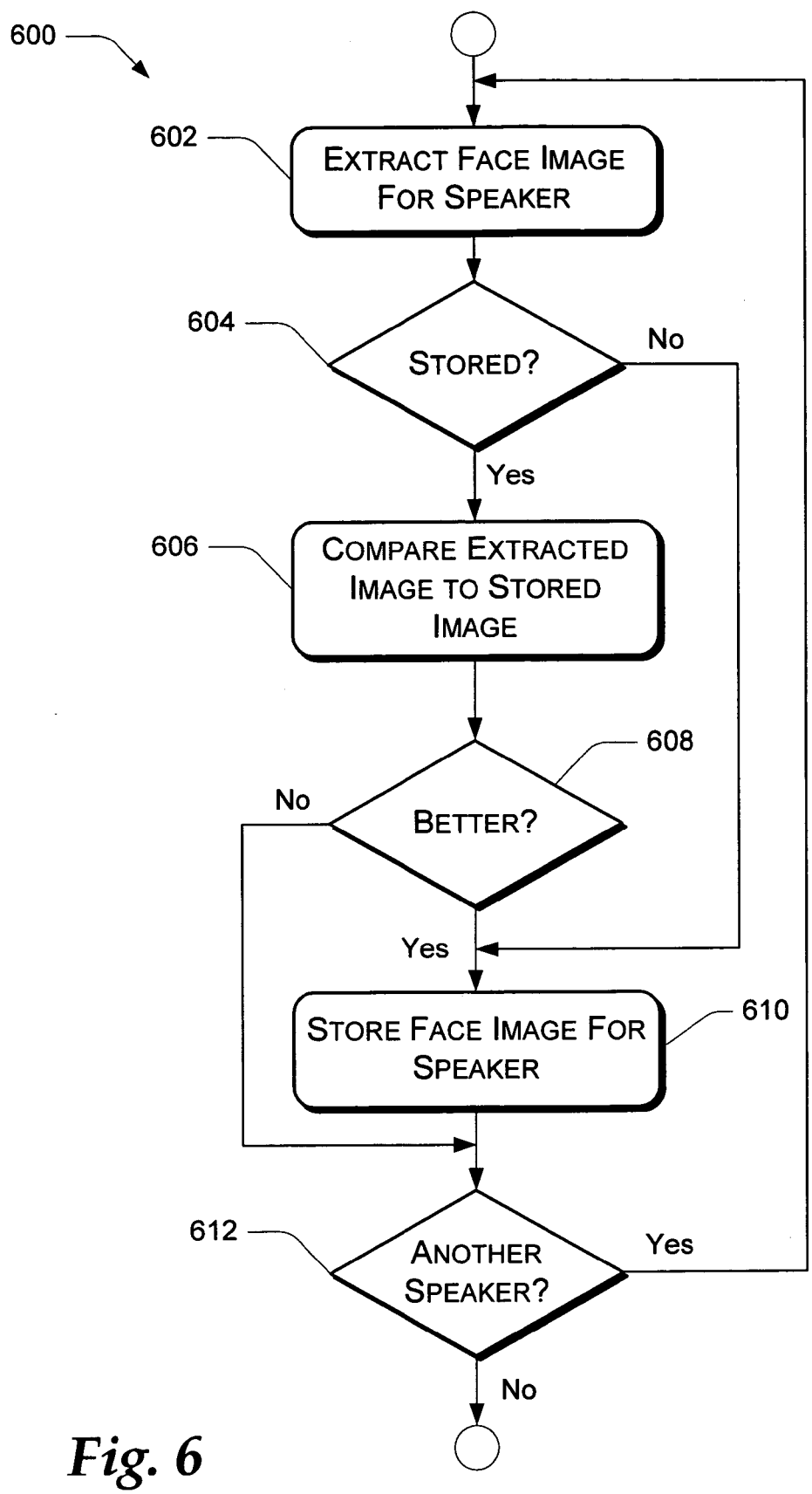
FIG. 6 is an exemplary flow diagram depicting a methodological implementation for creating a faces database.

FIG. 6 is an exemplary flow diagram 600 depicting a methodological implementation for creating a faces database. In the following discussion of FIG. 6, continuing reference is made to elements and reference numerals shown in one or more previous figures.

At block 602, the face extractor 240 extracts a facial image from the panoramic image as described above. If a facial image for the speaker is not already stored in the faces database 246 ("No" branch, block 604), then the facial image is stored in the faces database 246 at block 610. It is noted that determining if the facial image is stored does not necessarily depend on whether the person who appears in the facial image already has an image of their likeness stored, but whether the identified speaker has an image already stored that corresponds to the speaker. Thus, if a speaker located in a first position has a stored facial image and then the speaker is detected at a second location, a facial image of the speaker in the second location will not be compared with the stored facial image of the speaker in the first position to determine if the speaker already has a facial image stored.

If a facial image for the speaker is already stored in the faces database 246—hereinafter, the "stored facial image"— ("Yes" branch, block 604), then the facial image is compared to the stored facial image at block 606. If the face extractor 240 determines that the facial image is better or more acceptable than the stored facial image ("Yes" branch, block 608), then the facial image is stored in the faces database 246, thus overwriting the previously stored facial image.

If the facial image is not better than the stored facial image ("No" branch, block 608), then the facial image is discarded and the stored facial image is retained.

The criteria for determining which facial image is a better facial image can be numerous and varied. For instance, the face extractor 234 may be configured to determine that a "best" facial image is one that captures a speaker in a position where the speaker's face is most in a frontal position. Or, if a first facial image shows signs of motion and a second facial image does not, then the face extractor 246 may determine that the second facial image is the best facial image. Or, the face extractor 246 may be configured to determine which of multiple images of a speaker exhibits maximum symmetry and to use that facial image in the timeline. Other criteria not enumerated here may also be used to determine the most appropriate facial image to utilize with the timeline.

If there is another speaker ("Yes" branch, block 612), then the process reverts to block 602 and is repeated for each unique speaker. Again, "unique speaker" as used in this context does not necessarily mean a unique person, since a person that appears in different speaking locations may be interpreted as being different speakers. The process terminates when there are no more unique speakers to identify ("No" branch, block 612).

CONCLUSION

While one or more exemplary implementations have been illustrated and described, it will be appreciated that various changes can be made therein without departing from the spirit and scope of the claims appended hereto.

The invention claimed is:

1. A method, comprising:
   detecting two or more facial images in a video sample;
   detecting two or more speakers in an audio sample that corresponds to the video sample;
   detecting a primary speaker of the two or more speakers;
   clustering the two or more speakers temporally and spatially;
   storing a speaker timeline for each detected speaker that identifies the speaker by a speaker identifier and a speaker location at various times along a the speaker timeline;
   storing at least one facial image for each detected speaker in a faces database; and
   associating a speaker timeline and a facial image with each detected speaker.

2. The method as recited in claim 1, wherein the detecting two or more facial images further comprises using a face tracking to detect the two or more facial images.

3. The method as recited in claim 1, wherein the detecting two or more speakers further comprises using sound source localization to detect the two or more speakers.

4. The method as recited in claim 1, further comprising:
   identifying more than one facial image for each speaker; and
   selecting a best facial image to store in the faces database.

5. The method as recited in claim 4, wherein the selecting further comprises selecting a facial image that includes a most frontal facial view as being the best facial image.

6. The method as recited in claim 4, wherein the selecting further comprises selecting a facial image that exhibits the least motion as being the best facial image.

7. The method as recited in claim 4, wherein the selecting further comprises selecting a facial image that exhibits maximum symmetry as being the best facial image.

8. The method as recited in claim 1, wherein the speaker location is denoted by a speaker bounding box identified by video sample coordinates.

9. The method as recited in claim 1, wherein the speaker location is denoted by speaker face angles identified by azimuth and elevation in the video sample.

10. A method, comprising:
    displaying an audio/visual (A/V) sample having two or more speakers included therein;
    detecting a primary speaker of the two or more speakers;
    clustering the two or more speakers temporally and spatially;
    displaying a speaker timeline corresponding to each speaker of the two or more speakers, the speaker timeline indicating at what points along a temporal continuum the speaker corresponding to the speaker timeline is speaking;
    associating a speaker facial image with each speaker timeline, the speaker facial image corresponding to the speaker associated with the speaker timeline; and
    displaying the facial image with the corresponding speaker timeline.

11. The method as recited in claim 10, further comprising retrieving the speaker timelines from a timeline database that identifies each speaker by a speaker identifier, a speaker location and one or more times at which the speaker is speaking.

12. The method as recited in claim 10, further comprising retrieving the speaker facial image from a faces database that associates each speaker identifier with at least one facial image of a speaker corresponding to the speaker identifier.

13. Computer storage media containing executable instructions that, when executed, implement the following method:
    identifying each speaker in an Audio/Video ("A/V") sample by a speaker identifier;
    identifying location for each speaker in the A/V sample;
    detecting a primary speaker;
    clustering each identified speaker temporally and spatially;
    extracting at least one facial image for each speaker identified in the A/V sample;
    creating a speaker timeline for each speaker identified in the A/V sample, each speaker timeline indicating a time, a speaker identifier and a speaker location; and
    associating the facial image for a speaker with a speaker timeline that corresponds to the same speaker.

14. The computer storage media as recited in claim 13, further comprising identifying each speaker using sound source localization.

15. The computer storage media as recited in claim 13, further comprising identifying each speaker location using a face tracker.

16. The computer storage media as recited in claim 13, wherein the speaker location is identified by a speaker bounding box in the A/V sample.

17. The computer storage media as recited in claim 13, further comprising storing the speaker timelines and the facial images and linking each speaker timeline with the appropriate facial image.

18. The computer storage media as recited in claim 13, further comprising extracting more than one facial image for each speaker.

19. The computer storage media as recited in claim 18, further comprising selecting a best facial image to associate with the speaker timeline.

20. The computer storage media as recited in claim 19, wherein the selecting a best facial image further comprises selecting a facial image that has a maximum frontal facial image.

21. The computer storage media as recited in claim 19, wherein the selecting a best facial image further comprises selecting a facial image that exhibits the least motion.

22. The computer storage media as recited in claim 19, wherein the selecting a best facial image further comprises selecting a facial image that exhibits maximum facial symmetry.

23. Computer storage media, comprising:
a speaker timeline database that includes a speaker timeline for each speaker in an A/V sample, each speaker timeline identifying a speaker and a speaker location for multiple times along a time continuum wherein a primary speaker has been determined and wherein each identified speaker has been clustered temporally and spatially; and
a faces database that includes at least one facial image for each speaker identified in a speaker timeline and a speaker identifier that links each facial image with the appropriate speaker timeline in the speaker timeline database.

24. The computer storage media as recited in claim 23, wherein each speaker timeline in the speaker timeline database includes the appropriate speaker identifier to link the speaker timeline database with the faces database.

25. A system, comprising:
an Audio/Video ("A/V") sample;
means for identifying each speaker appearing in the A/V sample;
means for identifying a facial image for each speaker identified in the A/V sample;
means for detecting a primary speaker;
means for clustering each speaker temporally and spatially;
means for creating a speaker timeline for each speaker identified in the A/V sample; and
means for associating a facial image with an appropriate speaker timeline.

26. The system as recited in claim 25, wherein the means for identifying each speaker further comprises a sound source localizer.

27. The system as recited in claim 25, wherein the means for identifying a facial image further comprises a face tracker.

28. The system as recited in claim 25, wherein a speaker timeline identifies a speaker associated with the speaker timeline by a speaker identifier and a speaker location for each of multiple times along a time continuum.

29. The system as recited in claim 28, wherein the associating a facial image with an appropriate speaker timeline further comprises associating each facial image with the speaker identifier.

30. The system as recited in claim 25, further comprising storing the speaker timelines and the facial images.

31. The system as recited in claim 30, wherein the speaker timelines and the facial images are stored separately.

32. The system as recited in claim 25, wherein the A/V sample further comprises a recorded meeting.

* * * * *